UNITED STATES PATENT OFFICE.

MORRIS CHARLES LAMB, OF BERMONDSEY, ENGLAND, ASSIGNOR TO PETER SPENCE & SONS, LIMITED, OF MANCHESTER, ENGLAND.

TANNING PROCESS.

SPECIFICATION forming part of Letters Patent No. 722,857, dated March 17, 1903.

Application filed April 25, 1902. Serial No. 104,708. (Specimens.)

*To all whom it may concern:*

Be it known that I, MORRIS CHARLES LAMB, a subject of the King of Great Britain, residing at Bermondsey, in the county of London, England, have invented new and useful Improvements in Tanning Processes, of which the following is a specification.

This invention relates to the tanning of animal hides and skins by the aid of titanium salts and compounds, as hereinafter fully set forth.

Titanium salts and compounds have already been used or have been proposed to be used in connection with the dyeing of leather; but they have not hitherto been used or proposed to be used as or in conjunction with tanning agents to produce a tanning, preservative, or curing effect on animal hides or skins, as is shown in the specification of German Letters Patent granted to Carl Dreher, No. 126,508, where it is stated that these salts and compounds have no perceptible tanning effect. By means of the processes hereinafter described I have, however, found that perfect tanning, preservative, and curing effects are obtained by the aid of these salts and compounds.

According to my present improvements to effect the complete conversion of hides and skins into leather I first subject the skins or hides to the usual cleansing, depilatory, and bating or other preparatory processes and thereafter subject them to treatment with a solution or solutions containing titanium salts or compounds. In that step of the described process which consists in treating the goods with titanium salts or compounds I may employ coloring-matters and other substances which may be required to produce color or some desired physical character or quality in the product.

I have found that it is more advantageous to employ a solution of the basic sulfate of titanium and sodium, for the reason that it is the cheaper and more generally available salt of titanium; but other basic salts of titanium, such as the chlorid or oxalate, may be employed advantageously. Other basic salts may be equally well employed; but their price usually renders their use prohibitive. I have found that the basic salts give the better results; but I can nevertheless usefully employ the ordinary or normal salts. The stock basic titanium solution can be prepared by dissolving as much basic sodium-titanium sulfate as will give a strength equal to about specific gravity 1.075. The sulfate dissolves very slowly, and it is necessary to agitate the crystals in the water for a considerable time. If the solution is found to contain any material quantity of sulfuric acid over that required by the formula $TiOSO_4.Na_2SO_4$, it may previous to use be neutralized by the addition of a sufficient quantity of solution of sodium carbonate to effect the result desired, care being taken that stirring is continued during the mixing. The stock solution may be modified in various ways—as, for example and following existing practice, by the addition thereto of glucose, dextrine, or sugar, which allow the basic titanium solution to be made still more basic by the addition of alkali and improves the character of the goods. As already described also I may add suitable coloring-matters to the solution, so that the dyeing and tanning may proceed together.

It will be understood that the strength of the titanium solution must be determined experimentally in each case with regard to the production of different effects and to suit the skin, hide, or leather to be treated.

The skins, freed from grease, may be immersed in the stock solution and be paddled or drummed for from three to fifteen hours, according to their character and thickness and the result desired to be obtained. The goods are then washed, the liberated sulfuric acid is neutralized by a weak alkaline solution, and finished in the customary manner.

I have found that a tannage or curing produced by the aid of the titanium salt or compound solution alone cannot be removed by washing at ordinary temperatures and that goods so treated have a high commercial value.

Instead of paddling or drumming the goods, as described, in the titanium solution they may be suspended therein. In this case it is better to commence the treatment with a very weak solution and to gradually increase the strength by adding more stock solution as required and as is commonly practiced with analogous processes. When the desired result is found to be obtained, the goods are transferred to a ten-per-cent. solution of common salt for about two or three hours and are then washed and finished in the usual manner.

In a practical application of this invention and, by way of example, to each one hundred pounds weight of prepared pelt ready for tanning and placed in the drum with sufficient water one gallon of the stock solution is added. The drum is then revolved for one hour, when a further addition of one gallon of the stock solution is made. The drumming is continued, and an addition of one gallon of the stock solution is made at the end of each hour for about eight or ten hours or until it is found by cutting the thickest portion of one of the skins or hides under treatment that the titanium has penetrated right through and converted the pelt into leather. The goods are then washed with water and returned with sufficient water containing ten pounds of salt, in which they are drummed for about half an hour and afterward washed in warm water. The goods are then ready for dyeing or fat-liquoring, whichever operation has first to be performed. In the case of heavy goods, such as ox or cow hides, the goods may be suspended in a solution of the basic titanium sulfate having a specific gravity of about 1.0025. After about two or three hours the solution is strengthened by the addition of a sufficiency of the stock solution to restore the specific gravity to about 1.0025. After two hours another addition of stock solution is added to bring up the strength to about specific gravity 1.005. Further additions of the stock solution are made from time to time until the specific gravity is about 1.015, and it is found that on cutting the tannage has penetrated right through the goods, which are thereupon removed, washed in water, and suspended for half an hour in a solution of common salt, specific gravity about 1.025. The goods are then washed and can be dyed or fat-liquored. In any case the treatment with the salt solution may be omitted, if desired. Its function is to produce a much softer, a more pliable, and a more satisfactory leather.

Instead of drumming or paddling the goods or of suspending them in a solution of the salt of titanium, as hereinbefore described, it will suffice, if it be desired to cure the skins only, as in the preparation of wool mats, furs, and the like, to brush the titanium solution on the flesh side, as is practiced at present with other like curing agents. The strength of solution will have to be experimentally found in each case; but for ordinary cases the solution may have a strength of 1.0025 specific gravity, and the operation may be repeated until the desired result is obtained.

What I claim as my invention, and desire to secure by Letters Patent, is—

1. The process for converting animal hides and skins into leather, which consists in treating the prepared goods free from grease, with a solution of a titanium compound until the required tannage is produced.

2. The process for converting animal hides and skins into leather, which consists in treating the prepared goods free from grease, with a solution containing a titanium compound until the required degree of tannage is produced thereby, in neutralizing the acid liberated during the process, and in finally washing and drying the goods.

3. The process for converting animal hides and skins into leather, which consists in applying to the prepared goods freed from grease and from which the hair or wool has not been removed, a solution of a titanium compound by brushing it on the flesh side only.

In testimony whereof I have signed my name to this specification in the presence of two subscribing witnesses.

MORRIS CHARLES LAMB.

Witnesses:
 HENRY GEORGE BISHOP,
 WALTER ALBERT GREEN.